(12) United States Patent
Chen et al.

(10) Patent No.: US 12,031,271 B2
(45) Date of Patent: Jul. 9, 2024

(54) TRANSFER DEVICE APPLIED TO PULP MOLDED MANIPULATOR, AND PRODUCTION LINE

(71) Applicant: Zhejiang Shurcon Manufacturing Co. Ltd., Zhejiang (CN)

(72) Inventors: Shu Chen, Long Grove, IL (US); Gang Cen, Zhejiang (CN); Weimin Chen, Yilan (TW)

(73) Assignee: SHURCON MANUFACTURING, INC., Lake Barringtgon, IL (US)

( * ) Notice: Subject to any disclaimer, the term of this patent is extended or adjusted under 35 U.S.C. 154(b) by 22 days.

(21) Appl. No.: 17/427,517

(22) PCT Filed: Dec. 24, 2019

(86) PCT No.: PCT/CN2019/128103
§ 371 (c)(1),
(2) Date: Jul. 30, 2021

(87) PCT Pub. No.: WO2020/155947
PCT Pub. Date: Aug. 6, 2020

(65) Prior Publication Data
US 2022/0136172 A1    May 5, 2022

(30) Foreign Application Priority Data
Jan. 31, 2019 (CN) .......................... 201910098115.1

(51) Int. Cl.
*D21F 2/00*   (2006.01)
*B25J 11/00*   (2006.01)
(Continued)

(52) U.S. Cl.
CPC ............... *D21F 2/00* (2013.01); *B25J 11/005* (2013.01); *B25J 15/0616* (2013.01); *D21F 3/02* (2013.01); *D21F 7/00* (2013.01); *D21F 13/10* (2013.01)

(58) Field of Classification Search
CPC .... D21F 2/00; D21F 13/10; D21J 3/00; D21J 7/00; B25J 15/0633; B25J 15/06
See application file for complete search history.

(56) References Cited

U.S. PATENT DOCUMENTS

| 1,163,005 | A | 12/1915 | Hall |
| 2,879,935 | A | 3/1959 | Carter |

(Continued)

FOREIGN PATENT DOCUMENTS

| CN | 87206542 | 9/1988 |
| CN | 2035341 | 4/1989 |

(Continued)

OTHER PUBLICATIONS

International Search Report in International Application No. PCT/CN2019/128103, mailed Mar. 19, 2020 (8 pages).

(Continued)

*Primary Examiner* — Jacob T Minskey
*Assistant Examiner* — Matthew M Eslami
(74) *Attorney, Agent, or Firm* — Benesch, Friedlander, Coplan & Aronoff LLP

(57) ABSTRACT

A transfer device includes a wet blank transfer mold internally provided with an airtight air chamber, a front face with a recessed matching cavity configured to be sheathed on the outside of a pulp wet blank container and is recessed towards the airtight air chamber. The recessed matching cavity includes several small communicating holes provided respectively in an inner wall of each recessed matching cavity and at the bottom of the recessed matching cavity for (Continued)

communication between the recessed matching cavity and the airtight air chamber. A moving frame parallel to the wet blank transfer mold with evenly spaced vacuum cups, is connected to a back face of the wet blank transfer mold via a guiding mechanism. A driver connected between the back face of the wet blank transfer mold and the moving frame to drive the moving frame to move relative to the wet blank transfer mold.

7 Claims, 10 Drawing Sheets

(51) Int. Cl.
*B25J 15/06* (2006.01)
*D21F 3/02* (2006.01)
*D21F 7/00* (2006.01)
*D21F 13/10* (2006.01)

(56) References Cited

U.S. PATENT DOCUMENTS

| | | | |
|---|---|---|---|
| 3,065,875 | A | 11/1962 | Negoro |
| 5,628,402 | A | 5/1997 | Dickie et al. |
| 5,678,692 | A | 10/1997 | Gratz |
| 6,082,543 | A | 7/2000 | Beliveau |
| RE37,253 | E | 7/2001 | Moren et al. |
| 6,405,866 | B2 | 6/2002 | Arima |
| 6,576,089 | B1 | 6/2003 | Sato et al. |
| 6,918,997 | B2 | 7/2005 | Goto et al. |
| 8,511,473 | B1 | 8/2013 | Bontrager et al. |
| 8,701,891 | B2 | 4/2014 | Bontrager et al. |
| 9,138,898 | B2 | 9/2015 | Liu |
| 2003/0051845 | A1 | 3/2003 | Gale et al. |
| 2003/0111201 | A1 | 6/2003 | Sato et al. |
| 2004/0055928 | A1 | 3/2004 | Smith |
| 2004/0084166 | A1 | 5/2004 | Nonomura et al. |
| 2006/0131788 | A1 | 6/2006 | Takigawa |
| 2010/0294448 | A1 | 11/2010 | Pierce et al. |
| 2011/0113622 | A1 | 5/2011 | Liu |
| 2013/0134069 | A1 | 5/2013 | Babey et al. |
| 2015/0292154 | A1* | 10/2015 | Zheng ............. D21F 7/006 162/253 |
| 2018/0086511 | A1 | 3/2018 | Lin |
| 2019/0010663 | A1 | 1/2019 | Chen et al. |

FOREIGN PATENT DOCUMENTS

| | | | | |
|---|---|---|---|---|
| CN | 2055127 | | 3/1990 | |
| CN | 2138642 | | 7/1993 | |
| CN | 2439458 | Y | 7/2001 | |
| CN | 1423719 | | 6/2003 | |
| CN | 2832697 | Y | 11/2006 | |
| CN | 101288890 | A | 9/2008 | |
| CN | 101961921 | | 2/2011 | |
| CN | 102059706 | A | 5/2011 | |
| CN | 102465477 | A | 5/2012 | |
| CN | 102733268 | A | 10/2012 | |
| CN | 202595578 | U | 12/2012 | |
| CN | 203030868 | U | 7/2013 | |
| CN | 203622422 | U | 6/2014 | |
| CN | 203668762 | U | 6/2014 | |
| CN | 204263176 | U | 4/2015 | |
| CN | 204264636 | | 4/2015 | |
| CN | 105253621 | A | 1/2016 | |
| CN | 205387641 | U | 7/2016 | |
| CN | 106436489 | A | 2/2017 | |
| CN | 206142441 | U | 5/2017 | |
| CN | 107059491 | A | 8/2017 | |
| CN | 107195954 | A | 9/2017 | |
| CN | 206590564 | U | 10/2017 | |
| CN | 107813545 | A | 3/2018 | |
| CN | 107815930 | | 3/2018 | |
| CN | 107915044 | A | 4/2018 | |
| CN | 207259870 | U | * 4/2018 | ............. B25J 15/06 |
| CN | 207259870 | U | 4/2018 | |
| CN | 207404482 | U | 5/2018 | |
| CN | 108130824 | A | 6/2018 | |
| CN | 108396595 | B | 8/2018 | |
| CN | 108457132 | A | 8/2018 | |
| CN | 108589432 | A | 9/2018 | |
| CN | 208072083 | U | * 11/2018 | ............... D21J 5/00 |
| CN | 208121482 | U | 11/2018 | |
| CN | PR-CN-208072083 | U | * 11/2018 | ............... D21J 5/00 |
| CN | 208658569 | | 3/2019 | |
| CN | 110216710 | A | 9/2019 | |
| CN | 110219210 | A | 9/2019 | |
| CN | 209619753 | U | 11/2019 | |
| EP | 0798225 | A1 | 10/1997 | |
| EP | 1074657 | A1 | 2/2001 | |
| EP | 1285994 | A1 | 2/2003 | |
| JP | 2001254300 | A | 9/2001 | |
| JP | 2001303498 | A | 10/2001 | |
| JP | 2007039093 | A | 2/2007 | |
| TW | M538917 | U | 4/2017 | |
| TW | 610007 | U | 4/2021 | |
| WO | 03/014471 | A1 | 2/2003 | |
| WO | 2010/124300 | A1 | 10/2010 | |
| WO | 2018/216544 | A1 | 11/2018 | |
| WO | 2019/141117 | | 7/2019 | |

OTHER PUBLICATIONS

Written Opinion in International Application No. PCT/CN2019/128103, mailed Mar. 19, 2020 (4 pages).
First Opinion in CN Application No. CN201910098112.8, dated Apr. 28, 2023 (10 pgs.).
First Opinion in CN Application No. CN201910098115.1, dated Dec. 21, 2023 (6 pgs.).
PCT, International Search Report with English translation, and Written Opinion, PCT Patent Application No. PCT/CN2019/070942, 11 pages (Apr. 8, 2019).
China National Intellectual Property Administration (ISA/CN), Written Opinion (with English translation), International Application No. PCT/CN2019/128104, 5 pages, Mar. 18, 2020.
China National Intellectual Property Administration (ISA/CN), International Search Report/Written Opinion of the International Searching Authority (with English translation), International Application No. PCT/CN2019/128104, 6 pages, Mar. 18, 2020.
China National Intellectual Property Administration (ISA/CN), International Search Report/Written Opinion of the International Searching Authority (with English translation), International Application No. PCT/CN2019/128103, 8 pages, Mar. 19, 2020.
China National Intellectual Property Administration (ISA/CN), Written Opinion of the International Searching Authority (with English translation), International Application No. PCT/CN2019/128103, 8 pages, Mar. 19, 2020.

* cited by examiner

TRANSFER DEVICE APPLIED TO PULP MOLDED MANIPULATOR, AND PRODUCTION LINE

CROSS REFERENCED TO RELATED APPLICATION

This application claims priority to and the benefit from International Application PCT/CN2019/128103 titled "Transfer Device Applied To Pulp Molded Manipulator, And Production Line", filed on Dec. 24, 2019, which claims priority and the benefit from Chinese Application CN 201910098115.1, filed on Jan. 31, 2019, the contents of which are herein incorporated by reference in their entirety.

TECHNICAL FIELD

The present application relates generally to the technical field of pulp molding machinery, and particularly relates to a transfer device and a production line used for pulp molding manipulators.

BACKGROUND

During the production and processing of pulp molded products, it is necessary to carry out cold extrusion and hot forming, and the material is transported by manipulator between cold extrusion and hot forming.

The existing pulp molding production manipulator is generally equipped with a transfer mold jig, which is used to transfer the pulp molding wet blank to the mold or obtain and release the pressed products. Since only one action is performed at any given time, and the wet blank transfer and product acquisition and release cannot be completed at the same time, resulting in low production efficiency.

For example, Chinese patent application number CN 201320735610.7 discloses a handling manipulator for pulp molding machine. The manipulator has three degrees of freedom and can move in X, Y and Z directions. The movement (lateral movement) in the X direction is realized by two rod-less cylinders and linear guide rails, which can accurately realize the positioning in three states. The Y-direction movement (translation) and Z-direction movement (vertical lifting) can be realized by motor and screw rods, which can realize accurate positioning at any position within the travel range. The grasping and lowering of steel pallets are realized by turning on and off electromagnets. The manipulator can directly catch the goods produced by the pulp molding machine from the mold with pallets, and then place them on the trolley in sequence. The manipulator is simple in structure, easy to manufacture, low cost and stable in performance, which can replace manpower and save labor and production cost.

Although the above scheme has many advantages, it does not solve the above technical problems.

SUMMARY

The purpose of the present disclosure is to provide a transfer device and its production line for paper pulp molded manipulators, which can greatly improve production efficiency.

In order to achieve the above purpose, the present disclosure adopts the following technical scheme:

A transfer device applied to the pulp molding manipulator includes a wet blank transfer mold internally provided with an airtight air chamber, wherein the front face of the wet blank transfer mold is provided with at least one recessed matching cavity which can be sheathed on the outside of a pulp wet blank container and is recessed towards the airtight air chamber, and the recessed matching cavity matches the pulp wet blank container; several small communicating holes for communication between the recessed matching cavity and the airtight air chamber are respectively provided in the inner wall of each recessed matching cavity and at the bottom of the recessed matching cavity, the small communicating holes provided on the inner wall of the recessed matching cavity are circumferentially uniformly distributed and form at least one circle in an encircling manner, and the small communicating holes provided at the bottom of the recessed matching cavity are circumferentially uniformly distributed and form at least one circle in an encircling manner; a moving frame parallel to the wet blank transfer mold is connected to a back face of the wet blank transfer mold via a guiding mechanism; a driver is connected between the back face of the wet blank transfer mold and the moving frame and drives the moving frame to move relative to the wet blank transfer mold; several evenly spaced vacuum cups are provided on the moving frame, and the vacuum cups and the airtight air chamber are respectively connected with a vacuum-pumping system.

Preferably, two circles are provided at the bottom of the recessed matching cavity, and each circle is respectively formed by several circumferentially evenly distributed small communicating holes.

Preferably, the center of the bottom of the recessed matching cavity is provided with central holes for communicating the recessed matching cavity with the airtight air chamber.

Preferably, the wet blank transfer mold includes a main mold plate with a cavity on the back, wherein the cavity has an opening communicated with the outside, and several recessed matching cavities distributed in an array are provided on the front face of the main mold plate; several small communicating holes for communication between the recessed matching cavity and the airtight air chamber are respectively provided in the inner wall of each recessed matching cavity and at the bottom of the recessed matching cavity, the inner bottom part of the cavity is provided with several inner convex parts corresponding to the recessed matching cavities one by one, and the small communicating holes penetrate through the inner convex parts; the wet blank transfer mold also includes a closing mold plate for closing the cavity opening, and the airtight air chamber is formed between the main mold plate and the closing mold plate.

Preferably, the bottom of the chamber is provided with a reinforcing supporting structure contacting with a surface of the closing mold plate near to the chamber.

Preferably, the reinforcing supporting structure includes several first reinforcing supporting bulges with uniform transverse spacing and several second reinforcing supporting bulges with uniform longitudinal spacing, wherein the first reinforcing supporting bulges are located on the same straight line and at the transverse center of the chamber, the second reinforcing supporting bulges are located on the same straight line and at the longitudinal center of the chamber, the first reinforcing supporting bulges and the second reinforcing supporting bulges are in a cross shape, and one end of the first reinforcing supporting bulges far away from the bottom of the chamber abut against a surface of the closing mold plate near to the chamber, and one end of the second reinforcing supporting bulges far away from the bottom of the chamber abut against a surface of the closing mold plate near to the chamber.

Preferably, a first supporting plane is provided at one end of each first reinforcing supporting bulge abutting against the closing mold plate, and a second supporting plane is provided at one end of each second reinforcing supporting bulge abutting against the closing mold plate, and the first supporting plane and the second supporting plane are located in the same horizontal plane.

Preferably, the inner wall of the chamber is provided with several arc-shaped concave surfaces which are connected in sequence, and the outermost inner convex part of the inner convex parts corresponds to the arc-shaped concave surface one by one.

Preferably, the guiding mechanism includes several guide posts which are parallel to each other and one end of which is fixed on the back of the wet blank transfer mold, several guide sleeve fixing holes and guide sleeves fixed on the guide sleeve fixing holes are provided on the moving frame, and the guide sleeves are set on the guide posts one by one, and the guide sleeves are in sliding connection with the guide posts.

Preferably, six recessed matching cavities are taken as one area, and four such areas are provided on the front face of the wet blank transfer mold.

Preferably, two adjacent first reinforcing supporting bulges are connected by first arc-shaped connecting ribs, two second reinforcing supporting bulges are located outside the middle-most first reinforcing supporting bulge, and each second reinforcing supporting bulge is connected with the middle-most first reinforcing supporting bulge by a second arc-shaped connecting rib.

Preferably, the main mold plate and the closing mold plate are connected by a detachable connection structure.

Preferably, the detachable connection structure includes an annular shoulder provided in the circumferential direction of the main mold plate, wherein the thickness of the annular shoulder is smaller than that of the main mold plate, the back surface of the main mold plate is flush with that of the annular shoulder, each side edge of the closing mold plate is respectively pierced with a locking bolt which penetrates through a nail passing hole of the annular shoulder and is sheathed with a locking nut, and the lock nut is in contact with the front face of the annular shoulder.

Preferably, the front face of the annular shoulder is provided with a yielding notch communicated with the nail passing hole, and the locking nut is positioned in the yielding notch and contacts with the bottom surface of the yielding notch.

A pulp molding production line includes a pulp molding manipulator and at least one press, wherein a transfer device is connected to the pulp molding manipulator, an auxiliary frame between a movable lower mold holder and an upper mold holder is provided on the press, a lifting driving mechanism for driving the auxiliary frame to lift or fall vertically is provided on the press, the pulp molding manipulator forces the transfer device to extend into between the movable lower mold holder and the upper mold holder, and the lifting drive mechanism drives the auxiliary frame to contact with and forces the transfer device to move vertically upward or downward.

Compared with prior art, the present disclosure has the advantages in that:

1. Compared with prior art, the transfer of wet blanks and the taking of products can be carried out at the same time, the manipulator does not need to move, and the vacuum cup is extended to the product mold through the built-in direct-acting device to take out the products, thus achieving the purpose of transferring wet blanks and products at the same time, and greatly improving the production efficiency.

2. The transfer device has simple structure and low manufacturing cost.

3. The production line has greatly improved the production efficiency.

Figure 1:
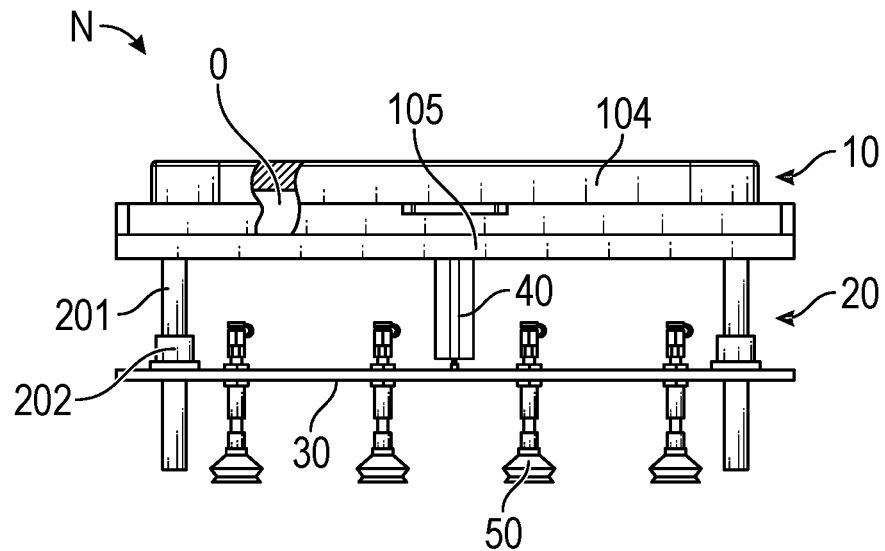
FIG. 1 is a schematic structural diagram of the transfer device of the present disclosure.

Reference designations in the figures are as follows: airtight air chamber 0, wet blank transfer mold 10, recessed matching cavity 101, small communicating holes 102, small central hole 103, main mold plate 104, cavity 1041, inner convex part 1042, first reinforcing supporting bulge 1043, second reinforcing supporting bulge 1044, first supporting plane 1045, second supporting plane 1046, arc concave surface 1047, first arc connecting rib 1048, second arc connecting rib 1049, closing mold plate 105, annular shoulder 106, yielding notch 107, guiding mechanism 20, guide post 201, guide sleeve 202, moving frame 30, driver 40, vacuum cup 50, vacuum-pumping system 60, pulp molding manipulator 3a, press 2a, transfer device Q, auxiliary frame N, auxiliary push plate 1, polygonal central through hole 11, first circular chamfer 111, second circular chamfer 112, cantilever lug boss 12, circular guide hole 121, reinforcing structure 13, transverse reinforcing rib 131, longitudinal reinforcing rib 132, lower base 2, vertical guide post 21, upper mold holder 3, movable lower mold holder 4, press master cylinder 41, lifting drive mechanism 5, fixed frame body 51, first elongated hole 511, second elongated hole 512, fixed plate 513, first bolt 514, and first cylinder 52.

DETAILED DESCRIPTION

The following is a detailed description of exemplary embodiments of the present disclosure with reference to the drawings, but the disclosure is not be limited to these embodiments.

As shown in FIGS. 1-4, a transfer device applied to a pulp molding manipulator includes a wet blank transfer mold 10 internally provided with an airtight air chamber 0, and at least one recessed matching cavity 101 which is sheathed outside a pulp wet blank container and recessed toward an airtight air chamber 0, can be provided on a front face of the wet blank transfer mold 10, wherein the recessed matching cavity 101 matches the pulp wet blank container. This structure can enlarge the contact surface with the wet blank container, and improve the efficiency and stability of material taking.

On an inner wall of each recessed matching cavity 101 and a bottom of each recessed matching cavity 101, several small communicating holes 102 are respectively used for communicating the recessed matching cavities with the airtight air chamber 0, the small communicating holes 102 provided on the inner wall of the recessed matching cavity 101 are circumferentially uniformly distributed and form at least one circle in an encircling manner. The small communicating holes 102 provided at the bottom of the recessed matching cavity 101 are circumferentially uniformly distributed and form at least one circle in an encircling manner. By designing at least one circle of small communicating holes 102 at different positions, the stability of material taking can be ensured.

In the preferred scheme, there are two circles at the bottom of the recessed matching cavity 101 in this embodiment, and each circle is formed by several small communicating holes 102 evenly distributed around the circumference.

Secondly, the center of the bottom of the recessed matching cavity 101 is provided with a small central hole 103 for communicating the recessed matching cavity 101 with the airtight air chamber 0.

A moving frame 30 parallel to the wet blank transfer mold 10 is connected to the back face of the wet blank transfer mold 10 via a guiding mechanism 20, wherein the guiding mechanism 20 includes several guide posts 201 which are parallel to each other and one end of which is fixed on the back face of the wet blank transfer mold 10, the moving frame 30 is provided with several guide sleeve fixing holes and guide sleeves 202 fixed on the guide sleeve fixing holes, the guide sleeves 202 are set on the guide posts 201, and the guide sleeves 202 are in sliding connection with the guide posts 201.

The coordination of guide sleeves 202 and guide posts 201 can further improve the smoothness and stability of lifting and lowering.

A driver 40 is connected between the back surface of the wet blank transfer mold 10 and the moving frame 30, and drives the moving frame 30 to move relative to the wet blank transfer mold 10. The driver 40 is any one of an air cylinder, an oil cylinder and a linear motor.

The moving frame 30 is provided with several evenly spaced vacuum cups 50, and the vacuum cups 50 and the airtight air chamber 0 are respectively connected with a vacuum-pumping system 60. The vacuum-pumping system 60 includes a vacuum pumping pipeline and vacuum pumping equipment connected with the vacuum pumping pipeline, and the vacuum pumping equipment is a commercially available product.

That is, when vacuum pumping equipment operates, the air in the airtight air chamber 0 is forced to be sucked out, and at this time, the wet blank container can be sucked and transferred into the forming mold by using the communicating hole 102 and the center hole 103, i.e., into the upper mold or the lower mold of the forming mold, and at the same time, the vacuum cup 50 can be lifted or lowered by the action of the driver, so as to suck the pulp molded products formed by the molding mold, and can complete the transfer and taking and placing actions at the same time, thus greatly improving the production and processing efficiency.

When releasing, just change vacuum pumping action to blowing action. Specifically, the wet blank transfer mold 10 of this embodiment includes a main mold plate 104 with a cavity 1041 on the back face, the cavity 1041 has an opening communicating with the outside, and several recessed matching cavities 101 distributed in an array are provided on the front face of the main mold plate 104. Several small communicating holes 102 for communication between the recessed matching cavity 101 and the airtight air chamber 0 are respectively provided in the inner wall of each recessed matching cavity 101 and at the bottom of the recessed matching cavity 101. The inner bottom of the chamber 1041 is provided with several inner convex parts 1042 corresponding to the recessed matching cavities 101 one by one, and the small communicating holes 102 can penetrate through the inner convex parts 1042. The wet blank transfer mold 10 also includes a closing mold plate 105 for closing the opening of the cavity 1041, and the airtight air chamber 0 is formed between the main mold plate 104 and the closing mold plate 105.

The inner convex part 1042 corresponds to the recessed matching cavity 101, so as to facilitate the development of the mold and reduce the manufacturing difficulty. The wet blank is not limited to the upper mold, and the product is not limited to the lower mold. That is to say, the wet blank can be transferred to the upper mold or the lower mold, and the corresponding product can be taken out from the lower mold or the upper mold. This objective can be achieved by the same device, which can be installed positively or reversely, or turned over by the end joint of the manipulator.

Wet blank transfer or product transfer can be performed through vacuum suction. There is an airtight air chamber in the wet blank mold, which is connected to the vacuum pipeline, and the vacuum cup is connected to the vacuum pipeline. For releasing the wet blank or product, vacuuming operation can be converted into blowing operation.

Figure 2:
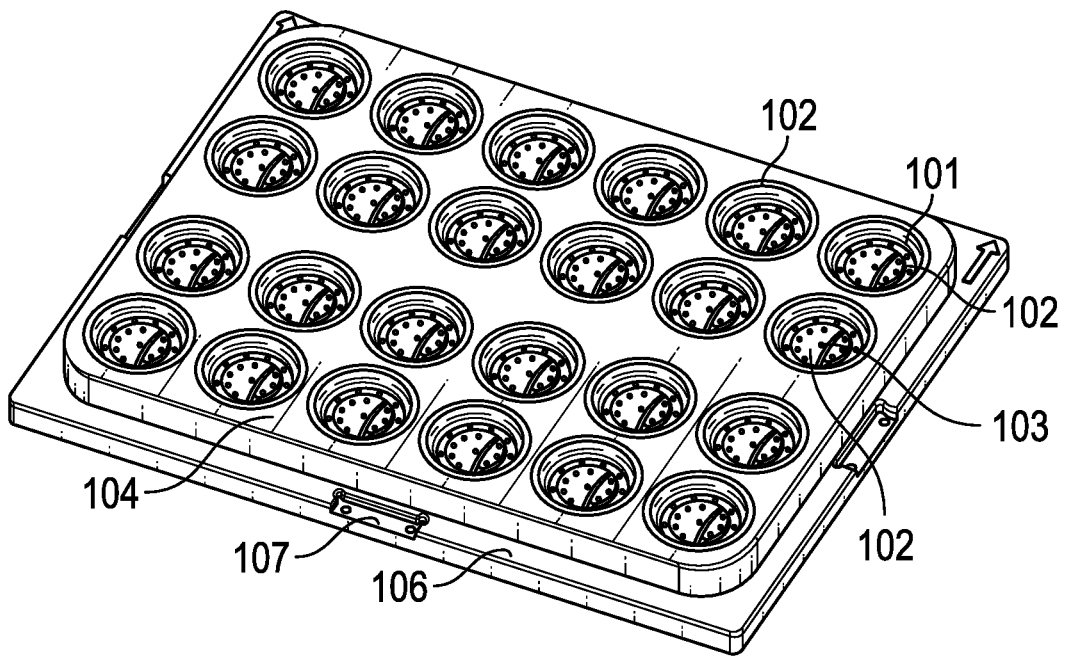
FIG. 2 is a schematic diagram of the front structure of the main mold plate of the transfer device of the present disclosure.
Figure 3:
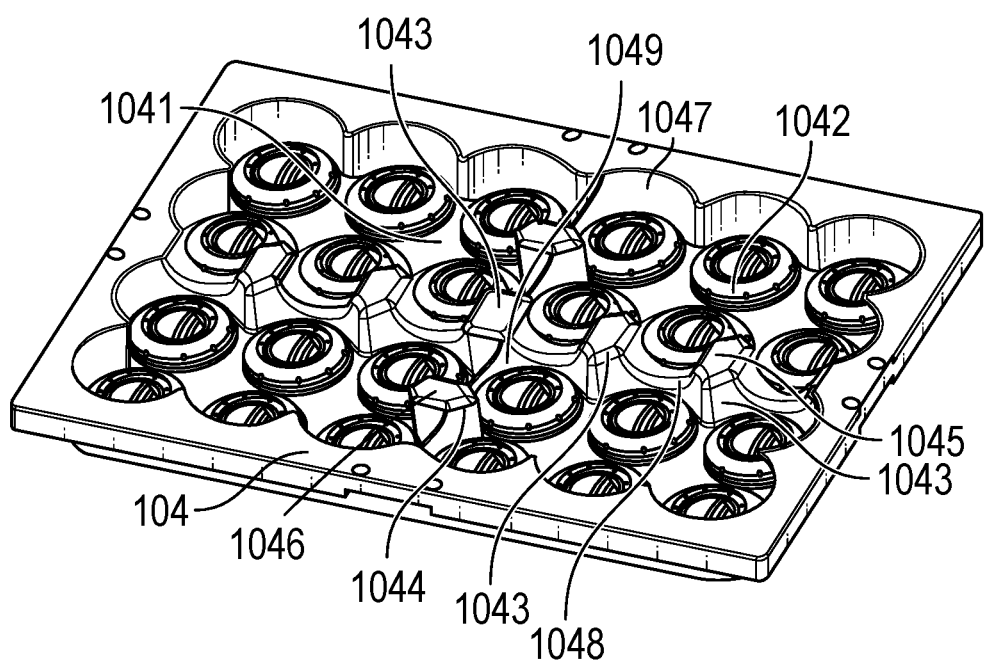
FIG. 3 is a schematic diagram of the back structure of the main mold plate of the transfer device of the present disclosure.
Figure 4:
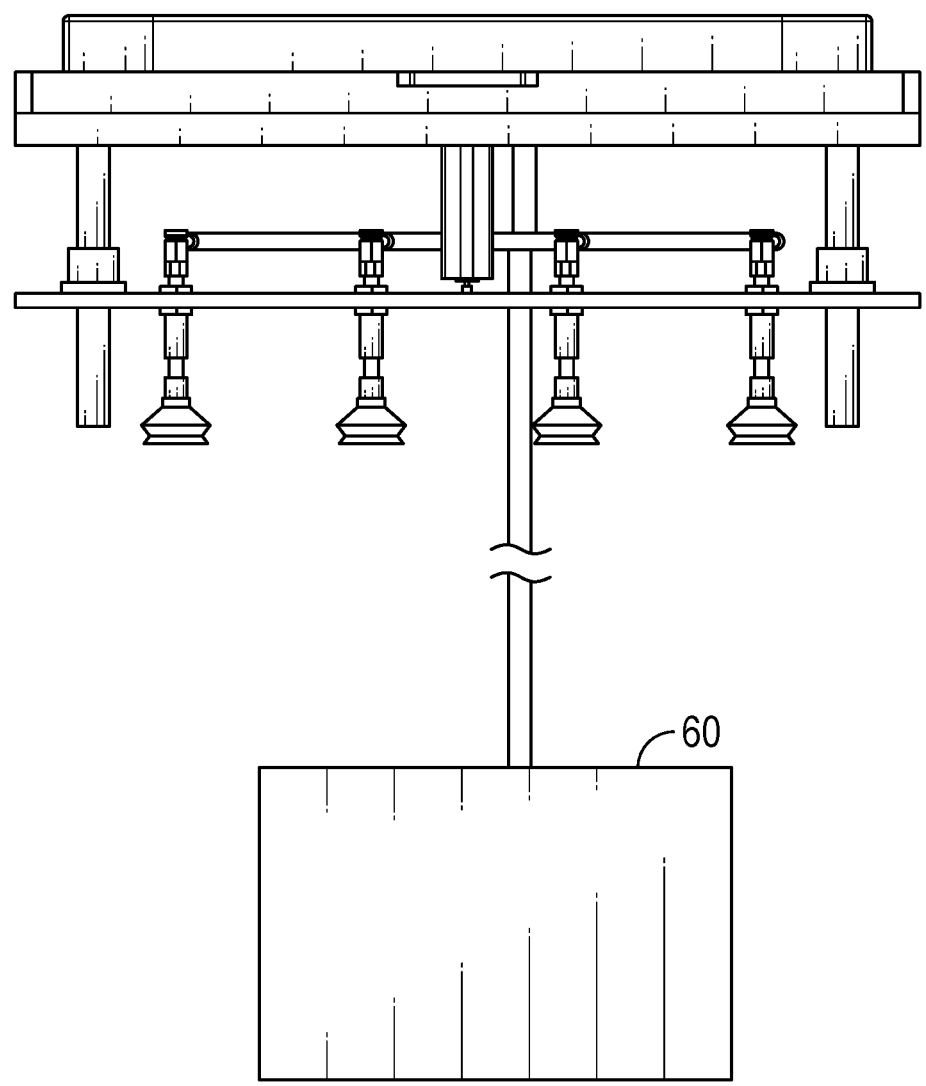
FIG. 4 is a schematic diagram of the connection structure between the transfer device and vacuum-pumping system of the present disclosure.
Figure 5:
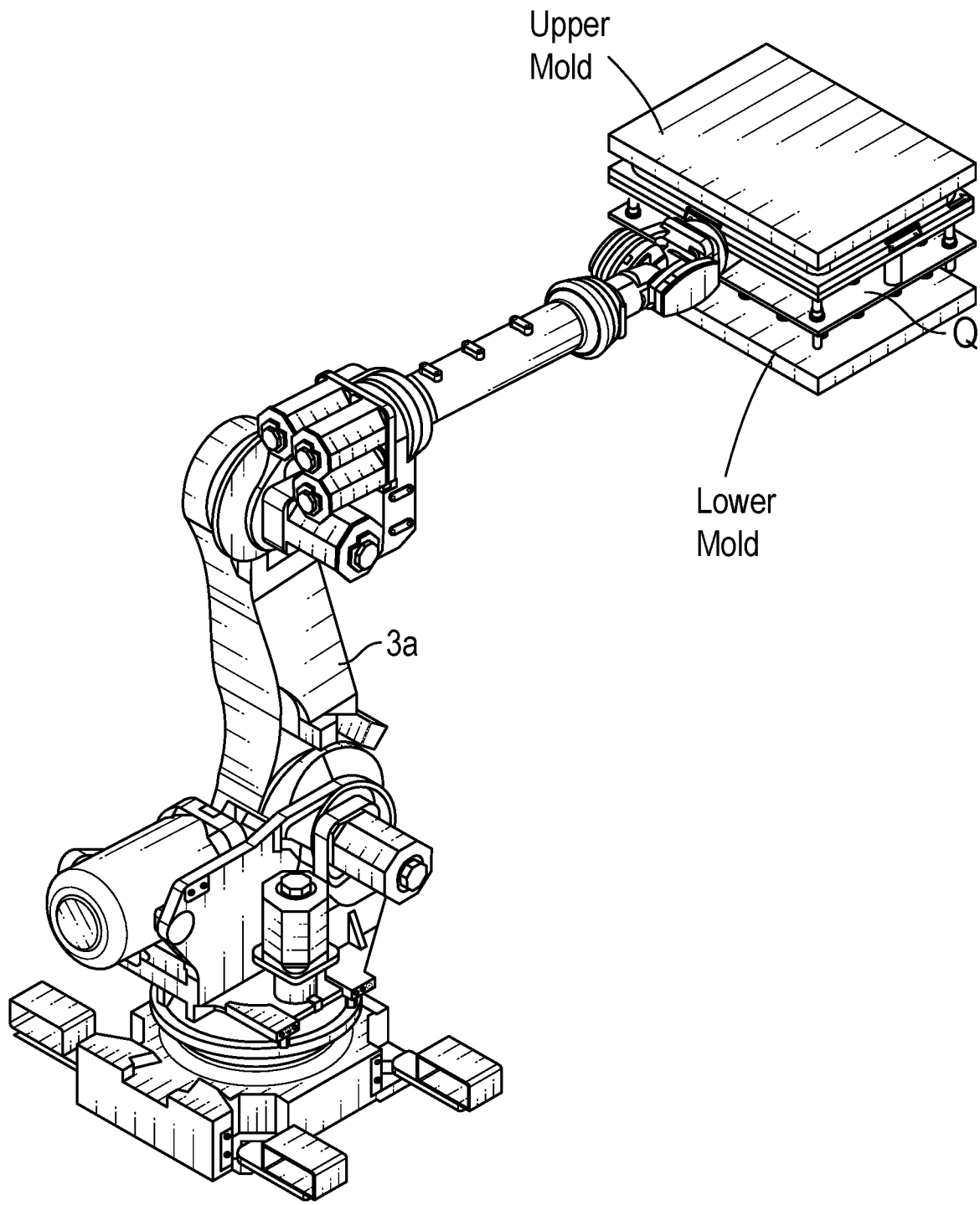
FIG. 5 is a structural diagram of the transfer device of the present disclosure after being installed on a manipulator.
Figure 6:
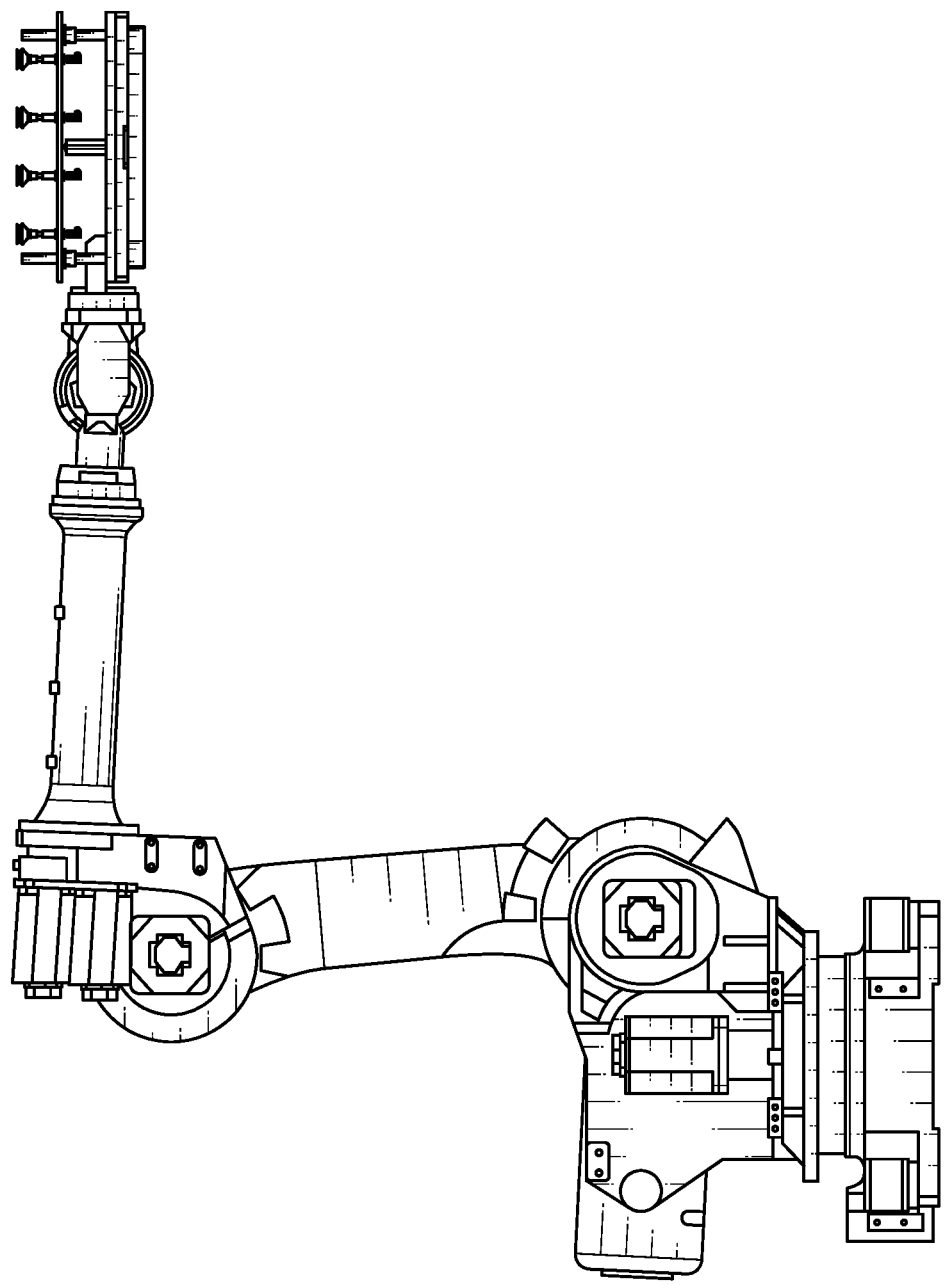
FIG. 6 is a structural schematic diagram of the transfer device in the first state of the present disclosure.
Figure 7:
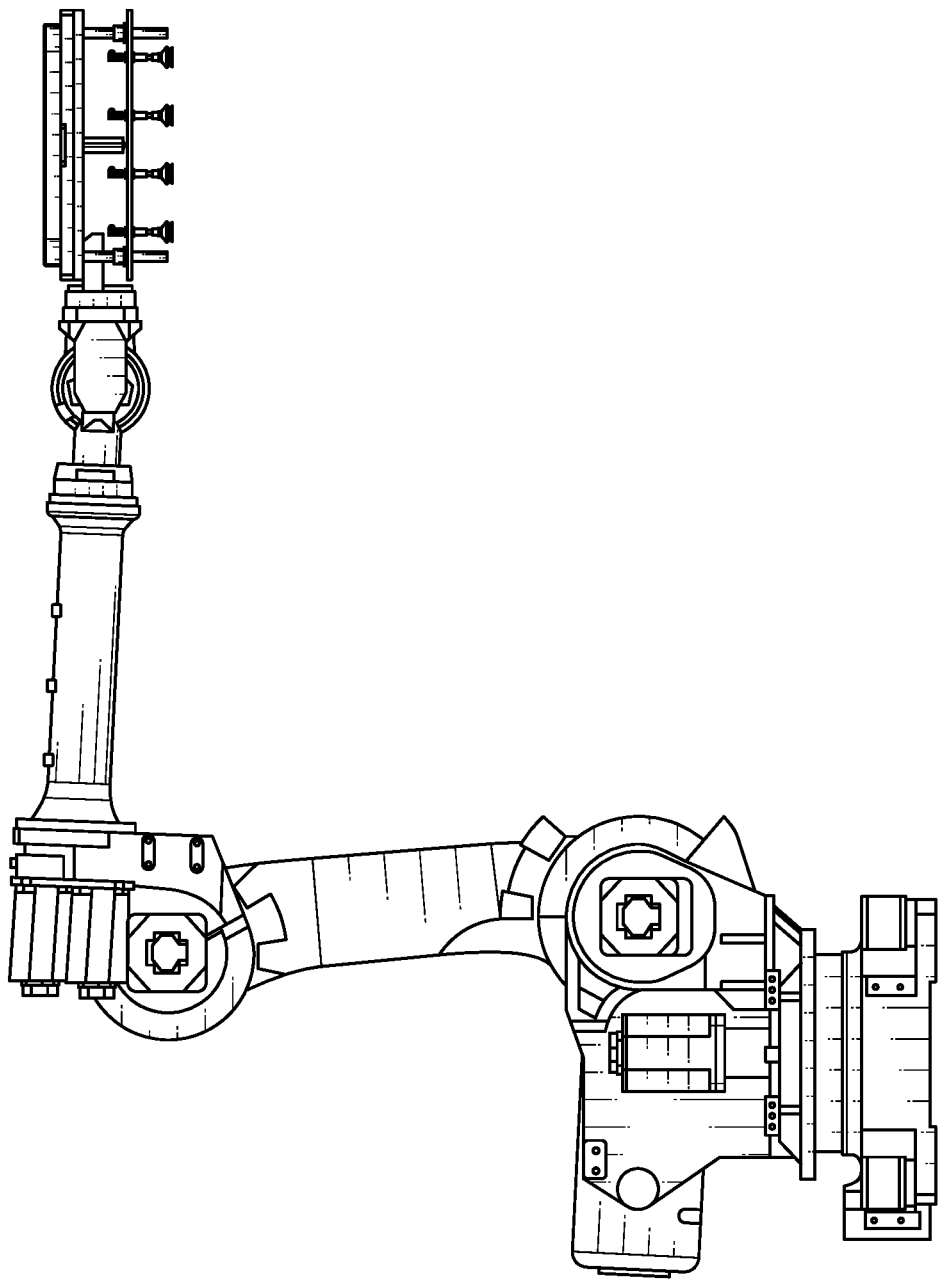
FIG. 7 is a structural schematic diagram of the transfer device in the second state of the present disclosure.
Figure 8:
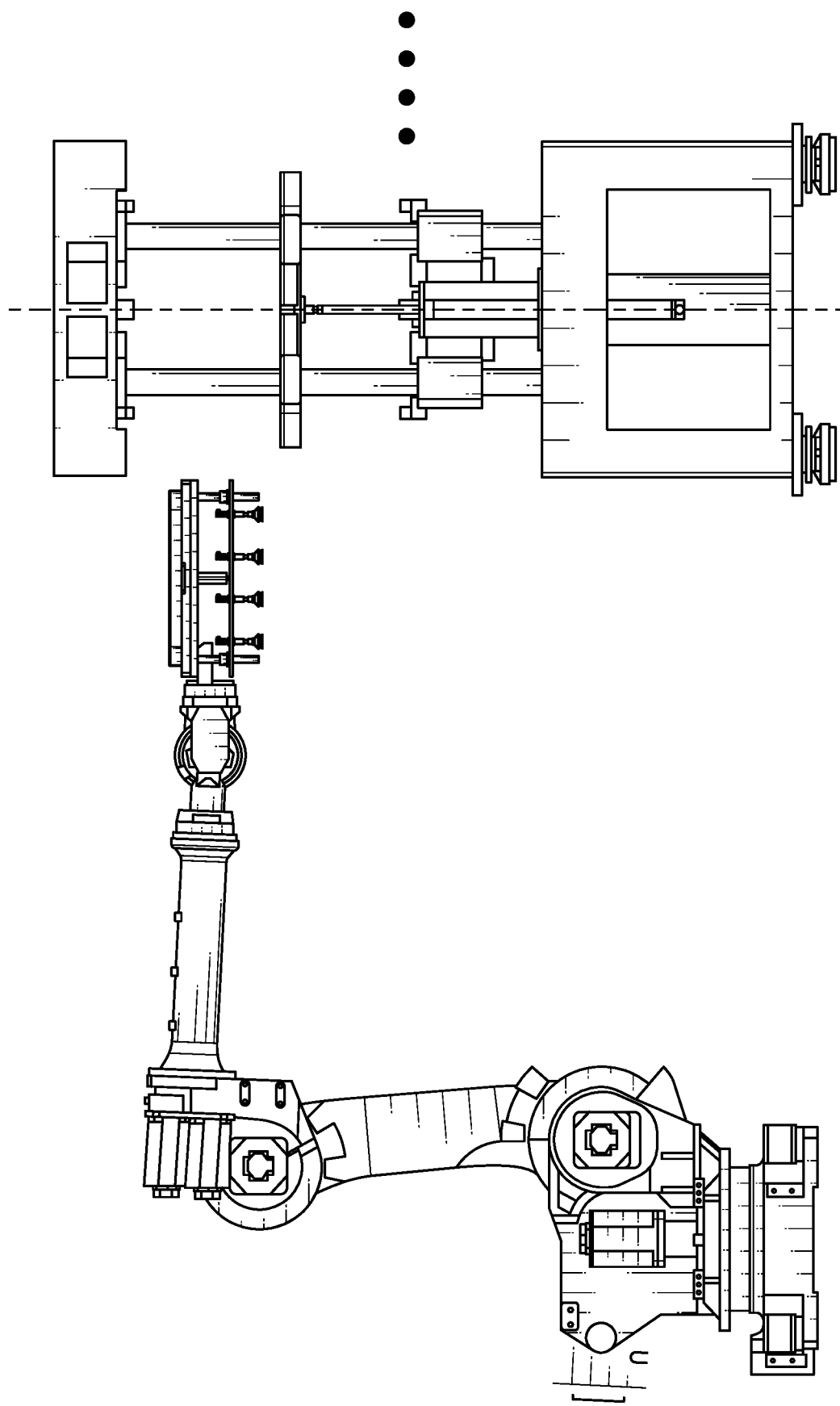
FIG. 8 is a schematic structural diagram of the production line of the present disclosure.
Figure 9:
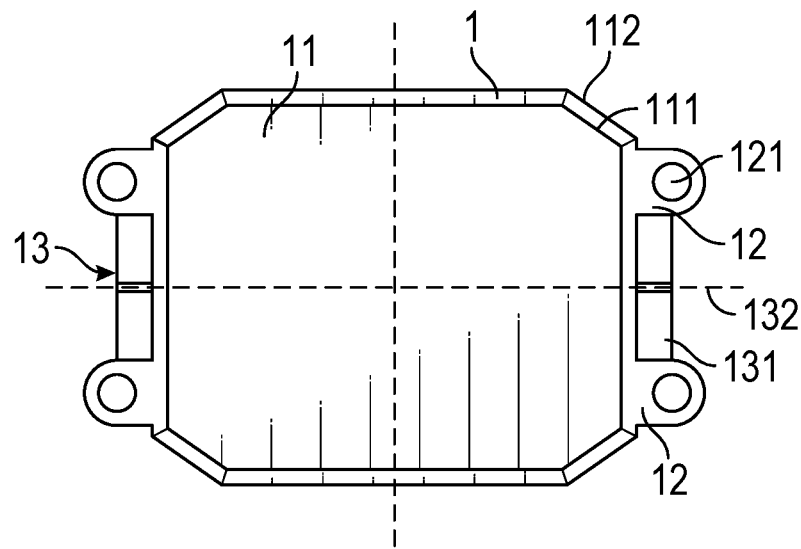
FIG. 9 is a schematic structural diagram of the auxiliary frame of the present disclosure.
Figure 10:
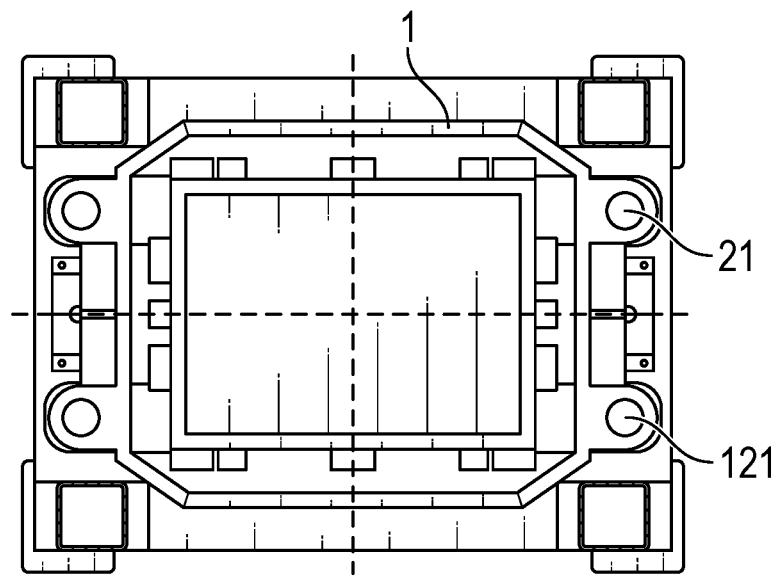
FIG. 10 is a structural diagram of the auxiliary frame of the present disclosure installed on the press.
Figure 11:
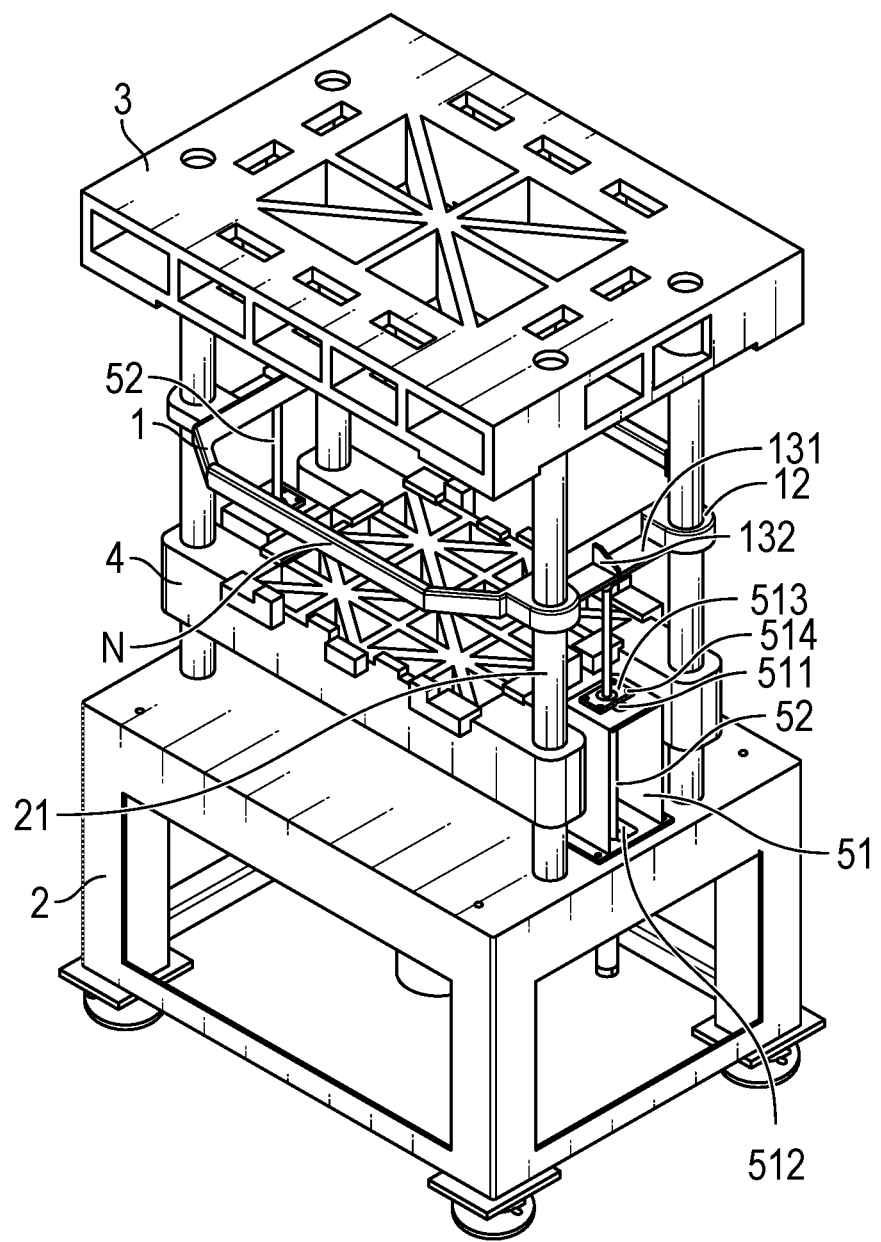
FIG. 11 is a schematic diagram of the three-dimensional structure of the press of the present disclosure.
Figure 12:
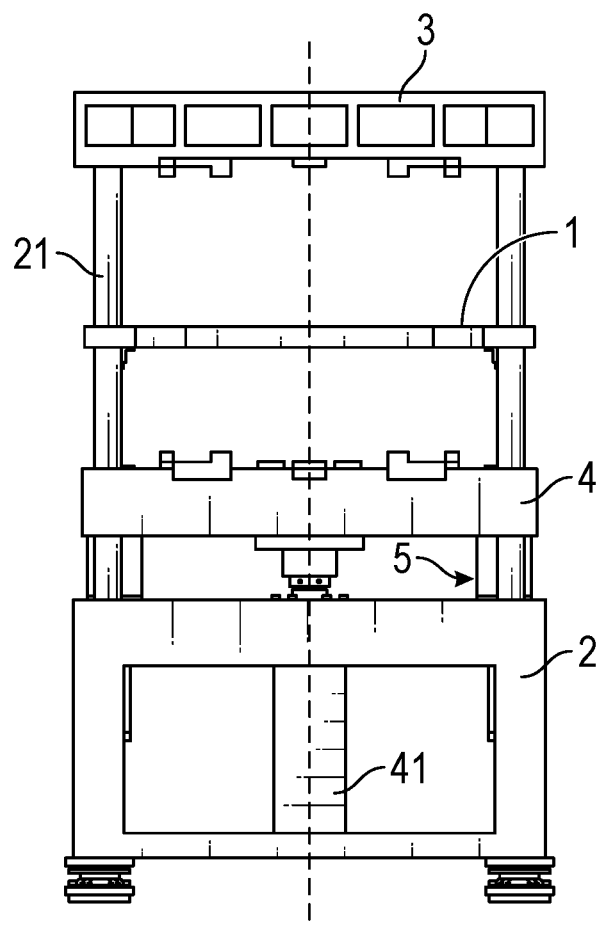
FIG. 12 is a schematic structural diagram of the press of the present disclosure.

As shown in FIGS. 2-3, the bottom of the cavity 1041 is provided with a reinforcing supporting structure which is in contact with a surface of the closing mold plate 105 near the cavity 1041. Specifically, the reinforcing supporting structure of this embodiment includes several first reinforcing supporting bulges 1043 with uniform transverse spacing and several second reinforcing supporting bulges 1044 with uniform longitudinal spacing. The first reinforcing supporting bulges 1043 and the second reinforcing supporting bulges 1044 are located on the same line and at the lateral center of the chamber 1041, forming a cross shape. The end of the first reinforcing supporting bulge 1043 which is away from the bottom of the chamber 1041 abuts against a surface of the closing mold plate 105 near the chamber 1041, and the end of the second reinforcing supporting bulge 1044 which is away from the bottom of the chamber 1041 abuts against a surface of the closing mold plate 105 near the chamber 1041.

The first reinforcing supporting bulges 1043 and the second reinforcing supporting bulges 1044 can further improve the structural strength and prolong the service life of the closing mold plate 105.

A first supporting plane 1045 is provided at one end of each first reinforcing supporting bulge 1043 abutting against the closing mold plate 105, and a second supporting plane 1046 is provided at one end of each second reinforcing supporting bulge 1044 abutting against the closing mold plate 105, which are located in the same horizontal plane. The supporting plane can improve the stability and reliability of contact.

The inner wall of the chamber 1041 is provided with several arc-shaped concave surfaces 1047 connected in sequence, and the outermost inner convex part 1042 of the inner convex parts 1042 corresponds to the arc-shaped concave surfaces 1047 one by one.

In addition, six of recessed matching cavities 101 of this embodiment are taken as one area, and the front face of the wet blank transfer mold 10 is provided with four of such areas.

Secondly, two adjacent first reinforcing supporting bulges 1043 are connected by first arc-shaped connecting ribs 1048, two second reinforcing supporting bulges 1044 are located outside the middle-most first reinforcing supporting bulge 1043, and each second reinforcing supporting bulge 1044 is connected with the middle-most first reinforcing supporting bulge 1043 by second arc-shaped connecting rib 1049.

In addition, in order to facilitate disassembly and connection, the main mold plate 104 and the closing mold plate 105 in this embodiment are connected by a detachable connection structure. Specifically, the detachable connection structure includes an annular shoulder 106 provided in the circumferential direction of the main mold plate 104, the thickness of which is smaller than that of the main mold plate 104, and the back of the main mold plate 104 is flush with the back of the annular shoulder. Each side of the closing mold plate 105 is pierced with a locking bolt, which penetrates through the nail passing hole of the annular shoulder, and a locking nut is sheathed on the locking bolt, which is in contact with the front face of the annular shoulder.

The front face of the annular shoulder is provided with a yielding notch 107 communicating with the nail passing hole, and the locking nut is located in the yielding notch and contacts with the bottom surface of the yielding notch.

As shown in FIGS. 1-12, a pulp molding production line includes a pulp molding manipulator 3a and at least one press 2a, wherein the press includes a lower base 2, four vertical guide posts 21 connected to the top of the lower base 2, an upper mold holder 3 connected to the upper ends of the four vertical guide posts 21, and a movable lower mold holder 4 positioned directly below the upper mold holder 3 and movably connected with the vertical guide posts 21. The movable lower mold holder 4 is connected with the press master cylinder 41, which drives the movable lower mold holder 4 to move up and down axially along the vertical guide posts 21. The press master cylinder 41 is fixed at the center of the lower base 2, and a telescopic rod of the press master cylinder 41 is connected facing upward with the center of the lower surface of the movable lower mold holder 4.

During production, the master cylinder 41 of the press drives the movable lower mold holder 4 to move up and down, which can improve the stability and reliability of lifting and lowering in cooperation with the vertical guide posts 21.

A transfer device Q is connected to a pulp molding manipulator 3a, and the transfer device Q is the above-mentioned "a transfer device applied to a pulp molding manipulator". The press 2a is provided with an auxiliary frame N located between the movable lower mold holder 4 and the upper mold holder 3, and the press is provided with a lifting drive mechanism 5 for driving the auxiliary frame to lift and lower in the vertical direction. The pulp molding manipulator forces the transfer device to extend into between the movable lower mold holder and the upper mold holder, and the lifting drive mechanism drives the auxiliary frame to contact with and forces the transfer device to move vertically upward or downward.

The auxiliary frame N includes a horizontally provided auxiliary push plate 1, which is made of metal material or non-metal material, and any material that can meet the strength requirements can be adopted in this embodiment.

The auxiliary push plate 1 is provided with a polygonal central through-hole 11. In an example, the polygonal central through-hole 11 in this embodiment is an octagonal through-hole, which can form the placement of the mold jig and contact with the mold jig, and force the mold jig to rise and fall under the action of the lifting drive mechanism.

Secondly, the periphery of the auxiliary push plate 1 is provided with outer sides corresponding to the hole walls of the octagonal through hole one by one, and the outer sides form an octagon.

Next, the upper and lower openings of the octagonal through-hole are respectively provided with first circular chamfers 111, and the two sides of each outer side are respectively provided with second circular chamfers 112.

Circular chamfering can avoid damaging mold jig or pulp products. Two cantilever bosses 12 are respectively provided at both ends of the auxiliary push plate 1, and each cantilever boss 12 is respectively provided with a vertically provided guide circular hole 121, and a reinforcing structure 13 is provided between the two cantilever bosses 12 provided at the same end.

Specifically, the reinforcing structure 13 includes transverse reinforcing ribs 131 connected between the two cantilever bosses 12 and connected with the outer wall of the auxiliary push plate 1, wherein longitudinal reinforcing ribs 132 are provided in the middle of the transverse reinforcing ribs 131 and the inner ends of the longitudinal reinforcing ribs 132 are connected with the outer wall of the auxiliary push plate 1.

The auxiliary push plate 1, cantilever bosses 12, transverse reinforcing ribs 131 and longitudinal reinforcing ribs 132 are integrally formed, which can improve the overall structural strength.

The lifting driving mechanism 5 drives the auxiliary push plate 1 to rise and fall between the movable lower mold holder 4 and the upper mold holder 3. At this time, under the action of the auxiliary push plate 1, the mold jig connected to the manipulator can be forced to rise or fall, while the manipulator does not need to perform upward or downward thrust action, thereby ensuring the working reliability of the manipulator, and also prolonging the service life of the manipulator, so that the production can be carried out continuously and smoothly, which is more in line with the production requirements of enterprises.

The lifting drive mechanism 5 includes two fixed frames 51 respectively fixed on the top of the lower base 2, and the first cylinders 52 are respectively fixed in each fixed frame body 51, and the telescopic rods of the first cylinders 52 facing upwards and are connected to the middle of the lower surface of the transverse reinforcing ribs 131 one by one.

The fixed frame body 51 is a rectangular frame and is vertically fixed. The upper central area of the fixed frame body 51 is provided with a first elongated hole 511, and the lower central area of the fixed frame body 51 is provided with a second elongated hole 512. The telescopic rod of the first cylinder 52 extends through the first elongated hole 511 and a fixing plate 513 is sheathed on the upper end of the cylinder body of the first cylinder 52. The fixing plate 513 is located on the upper surface of the opening of the first elongated hole 511, and several bolts 514 penetrate through the fixing plate 513. The bolts 514 are in a threaded connection with a threaded hole at the top of the fixing frame body 51, and the lower end of the first cylinder 52 extends through the second elongated hole 512.

The design of elongated holes is to facilitate position movement and adjustment. When the press is in operation, the movable lower mold holder 4 moves upward under the driving of the press master cylinder 41, and then the lower pulp product mold on the movable lower mold holder 4 and the upper pulp product mold on the upper mold holder 3 cooperate with each other to process pulp products. After the processing is finished, the manipulator at this time needs to obtain pulp products. The pulp products are obtained and released to the next station by installing a mold jig on the manipulator. In the process of obtaining or releasing, the auxiliary push plate 1 is forced to rise or fall in the vertical direction by the lifting drive mechanism 5, and the auxiliary push plate 1 is sheathed on the mold jig, which can assist the rising or falling of the mold jig, thereby eliminating the alarm caused by the upward or downward movement of the mold jig by using the manipulator.

What is claimed is:

1. A transfer device for use with a pulp molding manipulator, comprising: a wet blank transfer mold having an internal airtight air chamber defined therein, a front face defining at least one recessed matching cavity that is recessed towards the airtight air chamber, has a cavity shape that matches the pulp wet blank container, and is configured to be sheathed on an outside surface of a pulp wet blank container, a plurality of small communicating holes defined in an inner wall and at a bottom of each recessed matching cavity that extend, and provide a plurality of air communication pathways, between each recessed matching cavity and the airtight air chamber; a guiding mechanism coupled to a back face of the wet blank transfer mold wherein the guiding mechanism comprises a plurality of parallel guide posts each affixed at a first end to the back face of the wet blank transfer mold, and each slidably sheathed within a separate guide sleeve affixed within a guide sleeve fixing hole defined in the moving frame, such that the moving frame is slidably movable on the guide posts and with respect to the wet blanket transfer mold; a moving frame movably coupled to the guiding mechanism and disposed parallel to the back face of the wet blank transfer mold; a driver disposed between, and operatively coupled to, each of the back face of the wet blank transfer mold and the moving frame, and configured to drive movement of the moving frame, as guided by the guiding mechanism, relative to the wet blank transfer mold; a plurality of evenly spaced vacuum cups disposed on the moving frame that are each directed away from the back face of the wet blank transfer mold; and a vacuum-pumping system operatively coupled to each of the airtight air chamber and the vacuum cups, and configured to draw a vacuum in the airtight chamber and suction at each recessed matching cavity via the communicating holes disposed therebetween, and draw suction at each of the vacuum cups.

2. The transfer device of claim 1, wherein a center of the bottom of each recessed matching cavity has a plurality of small central holes defined therein extending between the recessed matching cavity and the airtight air chamber that are configured to permit air communication between each recessed matching cavity and the airtight air chamber.

3. The transfer device of claim 1, wherein the wet blank transfer mold comprises:
a main mold plate having a cavity defined in a back face thereof, wherein the cavity in the back face has an opening for communicating with the outside, and a plurality of recessed matching cavities distributed in an array are provided on the front face of the main mold plate;
the plurality of small communicating holes for communication between the recessed matching cavity and the airtight air chamber are respectively defined in the inner wall of each recessed matching cavity and at the bottom of the recessed matching cavity, the inner bottom part of the cavity in the back face of the main mold plate is provided with inner convex parts corresponding to the recessed matching cavities one by one, wherein the plurality of small communicating holes penetrate through the inner convex parts; and
a closing mold plate coupled to the back face of the main mold plate that closes the opening of the cavity defined in the back face of the main mold plate, and forms the airtight air chamber between the main mold plate and the closing mold plate.

4. The transfer device of claim 3, wherein the bottom of the chamber is provided with a reinforcing supporting structure contacting with a surface of the closing mold plate near to the chamber.

5. The transfer device of claim 4, wherein the reinforcing supporting structure comprises;
several first reinforcing supporting bulges with uniform transverse spacing; and
several second reinforcing supporting bulges with uniform longitudinal spacing, wherein,
the first reinforcing supporting bulges are disposed along a first straight line at a transverse center of the chamber, the second reinforcing supporting bulges are disposed along a second straight line at a longitudinal center of the chamber, and the first reinforcing supporting bulges and the second reinforcing supporting bulges are arranged in a cross shape, and
a first one end of each of the first reinforcing supporting bulges and the second reinforcing supporting bulges, located distal to the bottom of the chamber, each abut against a surface of the closing mold plate near the chamber.

6. The transfer device of claim 5, wherein a first supporting plane is provided at distal end of each first reinforcing supporting bulge abutting against the closing mold plate, and a second supporting plane is provided at the distal end of each second reinforcing supporting bulge abutting against the closing mold plate, and the first supporting plane and the second supporting plane are located in the same horizontal plane.

7. The transfer device of claim 5, wherein the inner wall of the chamber is provided with several arc-shaped concave surfaces which are connected in sequence, and the outermost inner convex part of the inner convex parts corresponds to the arc-shaped concave surface one by one.

* * * * *